Patented Oct. 21, 1952

2,614,939

UNITED STATES PATENT OFFICE 2,614,939

WEATHER-RESISTANT CONCRETE

Patrick J. Keating, Jr., Scarsdale, N. Y., assignor to The Texas Company, New York, N. Y., a corporation of Delaware No Drawing. Application April 13, 1949,
Serial No. 87,358

7 Claims. (Cl. 106—88)

This invention relates to cement and concrete of enhanced resistance to freezing and thawing.

The invention is concerned with the entrainment of air in cement and concrete to increase the resistance of the material to freezing and thawing and contemplates the incorporation of air in the material by means of oil emulsions and with the aid of soluble oils.

A soluble oil is an oil solution that disperses readily when added to water; it is a clear oil solution that is self-emulsifying when combined with water. Soluble oils are prepared by making a solution of the oil and various soaps and emulsifying agents producing clear solutions. When water is added to the soluble oil a milky emulsion is readily formed.

In the practice of the invention the soluble oil is added to the water employed in making the cement or concrete mix. The soluble oil in contact with the water immediately forms an emulsion which functions to entrain air in the mix in the form of finely divided disconnected bubbles.

By incorporating air in the cement or concrete through the agency of these emulsions it is found that a product of greatly enhanced resistance to freezing and thawing can be produced without significant impairment of strength. In making weather resistant concrete it is generally considered desirable to incorporate in the concrete quantities of air amounting to some 3-6% by volume. By means of the present invention such proportions of air in a highly divided and dispersed form through the aggregate mass can readily be obtained without any serious loss in compressive strength.

The preferred soluble oils are prepared from distillate lubricating oils, particularly naphthenic oils and oils of low or medium viscosity. The mineral lubricating oil may be compounded with various alkali metal soaps or emulsifying materials such as sulfonates, particularly mahogany sulfonates, naphthenates and resinates. Various substances may be included in the soluble oil mixture, such as mutual solvents of the oil and soaps and emulsifying agents and viscosity reducing solvents. Higher boiling alcohols improve the emulsifying properties. The soluble oil solutions are homogeneous or clear solutions and when they are added to water readily form highly stable emulsions. In the mixing of the cement or mortar or concrete air is entrained by the emulsions and incorporated therein to produce a product of greatly increased resistance to freezing and thawing.

Very small quantities of the soluble oils are adequate to produce sufficient air entrainment for concrete products highly resistant to freezing and thawing. Thus, small proportions of the order of .002 to 0.1 per cent by weight of the cement content are adequate for most mixes to effect the desired 3 to 6 per cent air entrainment.

The soluble oils are very convenient and easy to use in the preparation of concrete mixes. The presence of the soluble oil emulsion in the wet cement or concrete mix improves the workability of the mix and by the use of the soluble oil an accurate control can be obtained for securing the desired amount of air entrainment. The stable character of the emulsions from the soluble oils provides for retention of entrained air in the concrete product.

Example A

By way of example, a soluble oil was prepared from the following materials:

| | Per cent by weight |
|---|---|
| Sodium sulfonate oil mixture | 16.0 |
| Gum rosin | 4.2 |
| Naphthenic acid | 7.1 |
| Sodium hydroxide (49%) | 2.0 |
| Ethylene glycol monobutyl ether | 1.0 |
| Water | 0.9 |
| Pale oil | 68.8 |

The pale oil used in the preparation of this soluble oil was a naphthenic base lubricating oil having a viscosity of 70 seconds at 100° F. Saybolt-Universal. The sodium sulfonate oil mixture was obtained by the treatment of petroleum lubricating oil with sulfuric acid and caustic soda and extracting the sodium sulfonates. The extracted sulfonates were fluxed with pale oil to form the sodium sulfonate oil mixture. The rosin was dissolved in some of the pale oil and sodium sulfonate oil mixture under the application of heat. The naphthenic acid and the caustic solution were added and saponification effected, after which the water, the ethylene glycol monobutyl ether and the rest of the sodium sulfonate oil mixture and pale oil were added.

Example B

In another example a soluble oil was prepared from the following ingredients:

| | Per cent by weight |
|---|---|
| Sodium sulfonate oil mixture | 22.0 |
| Hard rosin | 2.5 |
| Sodium hydroxide (49%) | 0.7 |
| Water | 1.0 |
| Triethanolamine | 1.0 |
| Ethylene glycol monobutyl ether | 0.6 |
| Pale oil | 72.2 |

The same type of 70 viscosity pale oil and the same type of sodium sulfonate oil mixture were employed as in the previous example. The rosin was dissolved in a portion of the oil. After saponification was effected with the caustic soda, the triethanolamine, water, ethylene glycol monobutyl ether and the rest of the pale oil were added.

A concrete mix was prepared in accordance with the Standard Recommended Practice for the Design of Concrete Mixes (ACI No. 613—44, Journal American Concrete Institute, Proceedings, vol. 41, June, 1945). The mixer was charged first with sand, then with Portland cement and finally with coarse aggregate. After 15 seconds of dry mixing the water containing the soluble oil A was added and the materials were mixed for about 2–3 minutes. Another concrete mix was prepared in a manner similar to that of the preceding mix except that no air-entraining agent was added. The following table gives a significant comparison of the two concrete products:

|  | Control Concrete | Concrete with Soluble Oil A |
|---|---|---|
| Percent sand | 45 | 45 |
| Water-cement ratio (by wt.) | 0.54 | 0.50 |
| Water content—lbs. per cu. yd | 315 | 292 |
| Cement content—lbs. per cu. yd | 583 | 583 |
| Unit weight—lbs. per cu. ft | 145.9 | 141.1 |
| Slump—inches | 2.75 | 3.0 |
| Percent air | 1.5 | 5.1 |
| Unit compressive strength (28 day)—p. s. i. | 4,870 | 4,430 |
| Modulus of rupture—p. s. i. | 637 | 696 |
| Weight percent soluble oil-basis cement | 0 | 0.0272 |
| Theoretical unit—lbs. per cu. ft | 148.1 | 148.7 |

It will be seen that the compressive and flexural strengths of the concrete prepared with this soluble oil as the air-entraining agent fully satisfy the ASTM tentative specifications as outlined in ASTM Bulletin 148.

Concrete mixes were prepared with different proportions of the soluble oil A to effect air entrainment in various amounts. Thus, for example, in these particular concrete mixes, .0025 weight per cent of the soluble oil based on the cement content gave an air entrainment of 3 per cent by volume of concrete and .0300 per cent of soluble oil gave an air entrainment of 6 per cent. Samples of concrete were tested by the freezing and thawing test in which the samples were subjected to alternate freezing and thawing until they showed a weight loss of 20 per cent. The following table shows the amounts of air in the several samples and the corresponding number of cycles of freezing and thawing:

| Percent Air | Cycles |
|---|---|
| 2.69 | 224 |
| 4.82 | 318 |
| 6.70 | 360 |
| 9.86 | 320 |

By way of comparison the control sample of concrete, in the preparation of which no air-entraining agent was used, had a freezing and thawing test of 82 cycles and a material which has been recognized as an air-entraining agent gave a product with 5 per cent air entrainment having a freezing and thawing test of 118 cycles.

Concrete mixes were prepared with the soluble oil B used to entrain various amounts of air. These were given the freezing and thawing test with the following results:

| Percent Air | Cycles |
|---|---|
| 3.5 | 106 |
| 6.0 | 162 |
| 8.0 | 200 |

The sodium sulfonate oil mixture described herein is itself an air entraining agent. It may be dispersed in the water used in making the cement or concrete mix and functions to entrain air in the mixing of the cement or concrete. Concrete mixes prepared with this material as the air entraining agent gave the following results:

| Percent Sulfonate Oil Mixture | Percent Air | 28-day Compressive Strength, p. s. i. |
|---|---|---|
| 0.010 | 3.0 | 5,000 |
| 0.067 | 6.0 | 4,070 |

In the freezing and thawing tests the following results were obtained.

| Percent Air | Cycles |
|---|---|
| 4.0 | 152 |
| 6.0 | 175 |
| 7.0 | 180 |

Although a preferred embodiment of the invention has been described herein, it will be understood that various changes and modifications may be made therein, while securing to a greater or less extent some or all of the benefits of the invention, without departing from the spirit and scope thereof.

I claim:

1. A concrete of high compressive strength containing about 3–6% by volume of entrained air and having a high resistance to freezing and thawing prepared from a wet mix of Portland cement and aggregate containing an air entraining emulsion formed of water and soluble oil, the latter comprising as essential components a naphthene base distillate lubricating oil, mahogany sulfonate derived from the sulfonation of mineral lubricating oil, rosin soap and sodium naphthenate, said soluble oil being present in a quantity within a range of about .002–0.1% by weight of the Portland cement of the mix.

2. A wet concrete mix adapted upon hardening to yield a concrete of high compressive strength containing about 3–6% by volume of entrained air and having a high resistance to freezing and thawing, said wet concrete mix containing as essential ingredients Portland cement, aggregate and an air entraining emulsion formed of water and soluble oil, the latter comprising as essential components a naphthene base distillate lubricating oil, mahogany sulfonate derived from the sulfonation of mineral lubricating oil and rosin soap, said soluble oil being present in a quantity within a range of about .002–0.1% by weight of the Portland cement of the mix.

3. A wet concrete mix adapted upon hardening to yield a concrete of high compressive strength containing about 3–6% by volume of entrained air and having a high resistance to freezing and thawing, said wet concrete mix containing as essential ingredients Portland cement, aggregate, and an air entraining emulsion formed of water and soluble oil, the latter comprising as essential components a naphthene base distillate lubricating oil, mahogany sulfonate derived from the sulfonation of mineral lubricating oil, rosin soap and sodium naphthenate, said soluble oil being present in a quantity within a range of about .0025–.03% by weight based on the Portland cement of the mix.

4. The method of preparing concrete of high compressive strength containing about 3–6% by volume of entrained air and having a high resistance to freezing and thawing that comprises incorporating in a mix of Portland cement and aggregate an air entraining emulsion formed of water and soluble oil, the latter of which comprises as essential components a naphthene base distillate lubricating oil, mahogany sulfonate derived from the sulfonation of mineral lubricating oil and rosin soap, said soluble oil being employed in a quantity within a range of approximately .002–0.1% by weight based on the Portland cement content of the mix.

5. The method of preparing a concrete of high compressive strength containing about 3–6% by volume of entrained air and having a high resistance to freezing and thawing that comprises incorporating in a mix of Portland cement and aggregate an air entraining emulsion formed of water and soluble oil the latter of which comprises as essential components a naphthene base distillate lubricating oil, mahogany sulfonate derived from the sulfonation of mineral lubricating oil, rosin soap and sodium naphthenate, said soluble oil being employed in a quantity within a range of approximately .0025–.03% by weight based on the Portland cement content of the mix.

6. In the preparation of concrete of high compressive strength containing about 3–6% by volume of entrained air and having enhanced resistance to freezing and thawing from a wet mixture of Portland cement and aggregate, the step that consists in adding to the water employed in making the mix a soluble oil in a quantity within a range of approximately .002–0.1% by weight based on the Portland cement content of the mix and comprising as essential components a naphthene base distillate lubricating oil, mahogany sulfonate derived from the sulfonation of mineral lubricating oil, rosin soap and sodium naphthenate.

7. In the preparation of concrete of high compressive strength containing about 3–6% by volume of entrained air and having enhanced resistance to freezing and thawing from a wet mixture of Portland cement and aggregate, the step that consists in adding to the water employed in making the mix a soluble oil in a quantity within a range of approximately .002–0.1% by weight based on the Portland cement content of the mix and comprising as essential components a naphthene base distillate lubricating oil, mahogany sulfonate derived from the sulfonation of mineral lubricating oil and rosin soap.

PATRICK J. KEATING, Jr.

REFERENCES CITED

The following references are of record in the file of this patent:

UNITED STATES PATENTS

| Number | Name | Date |
| --- | --- | --- |
| 1,048,695 | Horn | Dec. 31, 1912 |
| 1,109,540 | Olson | Sept. 1, 1914 |
| 1,772,999 | Huber | Aug. 12, 1930 |
| 1,782,383 | Greider | Nov. 18, 1930 |
| 2,058,821 | Peck | Oct. 27, 1936 |

FOREIGN PATENTS

| Number | Country | Date |
| --- | --- | --- |
| 4,892 | Australia | of 1927 |
| 240,744 | Switzerland | of 1946 |
| 575,439 | Great Britain | of 1946 |